(12) United States Patent
Derks (10) Patent No.: US 9,541,816 B2
(45) Date of Patent: Jan. 10, 2017

(54) MOBILE INTERACTIVE PRESENTATION AND COLLABORATION SYSTEM

(71) Applicant: Milestone AV Technologies LLC, Eden Prairie, MN (US)

(72) Inventor: Derek L. Derks, Chanhassen, MN (US)

(73) Assignee: Milestone AV Technologies LLC, Eden Prairie, MN (US)

( * ) Notice: Subject to any disclaimer, the term of this patent is extended or adjusted under 35 U.S.C. 154(b) by 43 days.

(21) Appl. No.: 14/373,192

(22) PCT Filed: Feb. 22, 2013

(86) PCT No.: PCT/US2013/027401
§ 371 (c)(1),
(2) Date: Jul. 18, 2014

(87) PCT Pub. No.: WO2013/126754
PCT Pub. Date: Aug. 29, 2013

(65) Prior Publication Data
US 2015/0029473 A1    Jan. 29, 2015

Related U.S. Application Data

(60) Provisional application No. 61/603,158, filed on Feb. 24, 2012.

(51) Int. Cl.
*G03B 21/10*    (2006.01)
*H04N 9/31*    (2006.01)
(Continued)

(52) U.S. Cl.
CPC ............. *G03B 21/10* (2013.01); *G03B 21/145* (2013.01); *G03B 21/2093* (2013.01); *G03B 21/56* (2013.01); *H04N 9/3141* (2013.01)

(58) Field of Classification Search
CPC ....... G03B 21/10; G03B 21/145; G03B 21/56; G03B 21/2093; H04N 9/3141
See application file for complete search history.

(56) References Cited

U.S. PATENT DOCUMENTS 4,678,246 A * 7/1987 Ytter ..................... G09F 15/005
312/114
5,510,862 A    4/1996 Lieberman et al.
(Continued)

FOREIGN PATENT DOCUMENTS

EP    0767584 A2    4/1997

OTHER PUBLICATIONS

PCT International Preliminary Report on Patentability (Chapter I of the PCT), mailed Sep. 4, 2014 and PCT Written Opinion of the International Searching Authority, mailed Jun. 26, 2013, for PCT/US2013/027401 (9 pgs).

*Primary Examiner* — Sultan Chowdhury
*Assistant Examiner* — Magda Cruz
(74) *Attorney, Agent, or Firm* — Patterson Thuente Pedersen, P.A.

(57) ABSTRACT

A mobile interactive presentation and collaboration system having a projector carriage is positioned rearward of a screen assembly such that a projector positioned on the projector carriage operates as a counterweight balancing the screen assembly to prevent die screen assembly from tipping forward. The projector carriage is positioned at the base of the screen assembly to lower the center of gravity of the system to further improve the stability of tire system.

17 Claims, 8 Drawing Sheets

(51) Int. Cl.
 *G03B 21/20* (2006.01)
 *G03B 21/56* (2006.01)
 *G03B 21/14* (2006.01)

(56) References Cited

U.S. PATENT DOCUMENTS

| | | | |
|---|---|---|---|
| 5,624,173 A | 4/1997 | Davidson | |
| 6,334,687 B1* | 1/2002 | Chino | G03B 21/10 248/920 |
| 2005/0168707 A1* | 8/2005 | Feldpausch | G03B 21/00 353/79 |
| 2007/0217203 A1* | 9/2007 | Ueda | H04N 9/3141 362/294 |
| 2008/0231932 A1* | 9/2008 | Machii | G03B 21/10 359/238 |
| 2010/0053029 A1 | 3/2010 | Wilzbach et al. | |
| 2014/0251841 A1* | 9/2014 | Corey | G03B 21/10 206/223 |

* cited by examiner

MOBILE INTERACTIVE PRESENTATION AND COLLABORATION SYSTEM

RELATED APPLICATIONS

The present application is a National Stage entry of PCT Application No. PCT/US2013/027401 filed Feb. 22, 2013, which claims the benefit of U.S. Provisional Application No. 61/603,158 entitled MOBILE INTERACTIVE PRESENTATION AND COLLABORATION SYSTEM and filed Feb. 24, 2012, said applications being hereby incorporated by reference in their entirety.

FIELD OF THE INVENTION

The present invention is generally directed to mobile interactive presentation and collaboration systems. Specifically, the present invention is directed to a mobile interactive presentation and collaboration system having a short-throw rear projector.

BACKGROUND OF THE INVENTION

Interactive computer based presentation and collaboration system have recently seen increased use. These collaboration systems often comprise a large interactive display that permits multiple users to simultaneously view and interact with the display. However, due to the high cost and substantial inconvenience of installing these systems, it is often highly desirable that the systems be mobile to allow a single system to be moved between multiple locations such as multiple conference rooms. Similarly, certain meeting spaces may not be suited for permanent installation of the systems or intended for only as a one-time meeting space.

An approach to making these systems mobile is pairing a short throw projector with a conventional whiteboard mounted a wheeled cart. Typically, the projector is a separate system that is positioned a distance from the cart and aimed at the white board. A drawback of this approach is that users often walk in front of the projector or standing at the white board blocking or partially obscuring the projected image. Alternatively, the projector is suspended from an arm extending from the top of the projector. The extreme angle of the projector reduces the likelihood that a user will be positioned to block the image. However, an inherent drawback of this system is that the top mounted arm with the extended projector can make the system is top-heavy and prone to tipping. Similarly, the front wheels of the cart must project substantially in front the white board to prevent the whiteboard from tipping forward. In particular, the top arm used to suspend a front projector in front of the screen shifts the center of mass of the system forward creating an even greater risk of the screen tipping forward. This arrangement can make accessing the whiteboard difficult or create a tripping hazard as users often move in front of the whiteboard during a presentation or collaboration.

A similar drawback is that a direct projection of the image onto the front of a whiteboard often produces an inferior quality image. For example, any residue left from writing on whiteboard with dry erase markers can degrade or obscure the projected image. Similarly, whiteboard materials are prone to warping, which can further distort the projected image.

Accordingly, there is a need for a mobile interactive presentation and collaboration system that addresses the drawbacks of presently available system.

SUMMARY OF THE INVENTION

The present invention is directed to a mobile interactive presentation and collaboration system having a screen assembly and a projector carriage, both positioned on a wheeled cart. The projector carriage is positioned rearward of the screen assembly and oriented in a generally horizontal orientation for receiving a short throw rear projector for projecting an image against a generally vertical rear projection surface of the screen assembly. In certain embodiments, the projector carriage projects rearward from screen assembly proximate to or at the bottom of the rear projection surface such that a projector positioned on the horizontal shelf acts as a counterweight preventing the rear projection surface from tripping forward. In other embodiments, the projector carriage is positioned on the wheeled cart rearward of the rear projection screen such that the projector back weights the wheeled cart to prevent the screen assembly from tipping forward.

The counter weighting of the screen assembly by the horizontally oriented rear projector allows the screen assembly to be positioned closer to the front portion of cart chassis than a conventional system having a top arm suspending a front projector in which requires that a portion of the chart chassis to project in front of the screen assembly to prevent the screen assembly from tipping forward. Similarly, the low position of the projector at or proximate the bottom of the screen assembly improves the overall stability of the system. Accordingly, the counterbalancing of the screen assembly with the projector allows the cart chassis to have a smaller footprint making the system more easily moved.

The rear projection screen comprises a semi-transparent material such as a vinyl projection screen, tempered glass pane, polycarbonate or other acrylic material capable of displaying the image projected by the rear projector such the image can be viewed from the front of the projection screen. In certain embodiments, the rear projection screen can comprise a rigid material allowing the rear projection screen to be marked on the front side with an erasable marker or similar writing utensil to allow users to mark or annotate the images projected onto the rear projection screen.

A mobile interactive presentation and collaboration system, according to an embodiment of the present invention, comprises a cart chassis, a screen assembly and a projector carriage. The cart chassis comprises an elongated front member and at least two side members projecting rearward from the front member to support the front member in a front to back direction. Similarly, the screen assembly comprises two side supports projecting vertically from the cart chassis and supporting a rear projection screen in a generally vertical orientation, wherein the rear projection screen comprises a front face and a rear face and positioned substantially forward of a midpoint of the side members of the cart chassis along the front to back direction. The projector carriage defines a generally horizontal shelf for receiving a projector for directing an image at the rear face of the rear projection screen, wherein the projector carriage is positioned rearward from the rear projection screen at about the bottom of the rear projection screen such that the projector counterweights the screen against tipping forward.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures and the detailed description that follow more particularly exemplify these embodiments.

BRIEF DESCRIPTION OF THE FIGURES

The embodiments of the present invention may be more completely understood in consideration of the following detailed description of various embodiments in connection with the accompanying drawings, in which.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

Figures 1, 2:
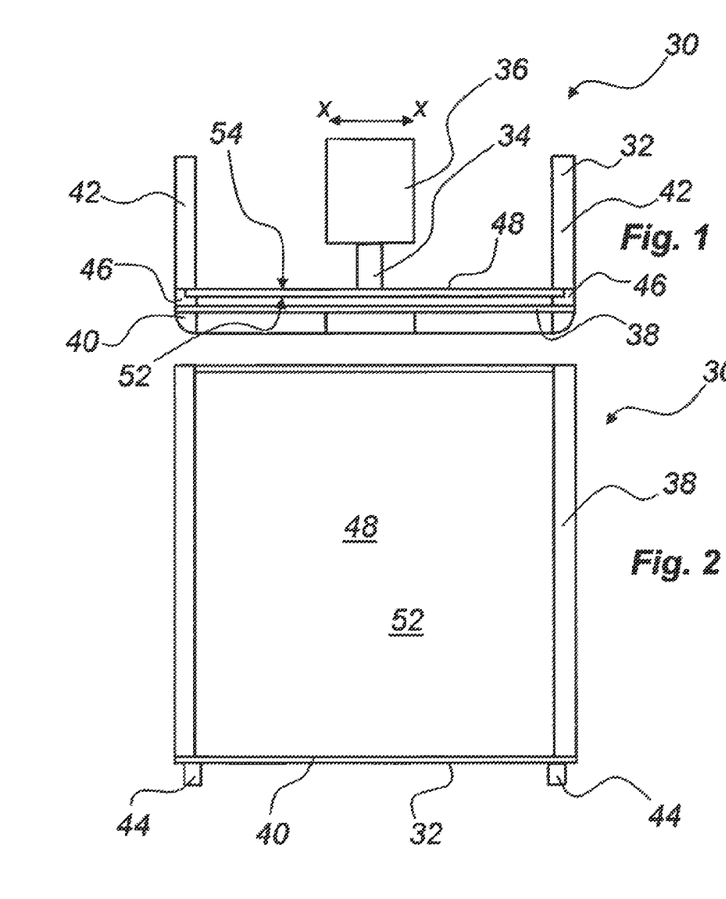
FIG. 1 is a top plan view of a mobile interactive presentation and collaboration system according to an embodiment of the invention.
FIG. 2 is a front elevation view of the system of FIG. 1.
Figure 3:
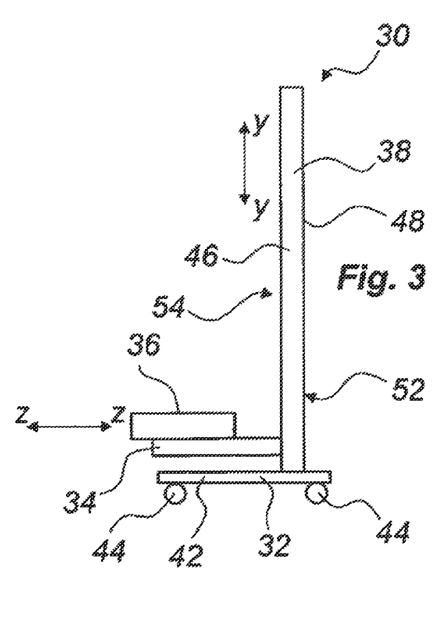
FIG. 3 is a side elevation view of the system of FIG. 1.
Figure 4:
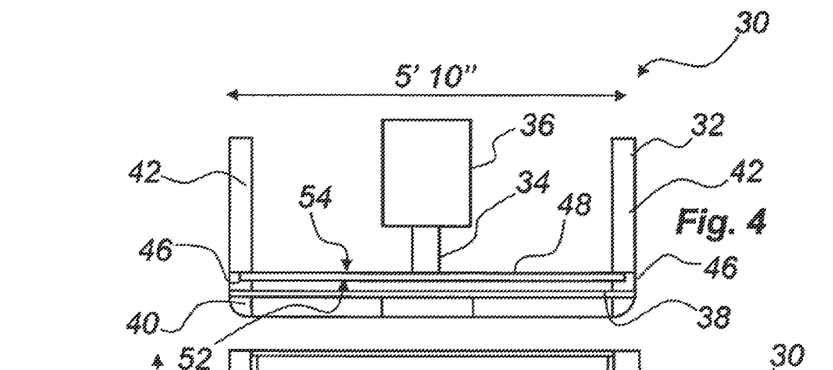
FIG. 4 is a top plan view of a mobile interactive presentation and collaboration system according to an embodiment of the invention in which an Epson Model 450W projector is used in the system.
Figure 5:
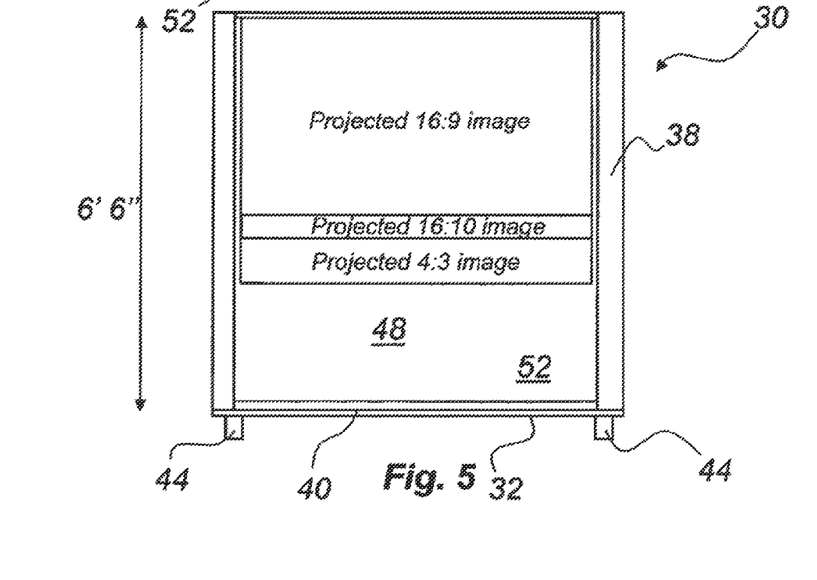
FIG. 5 is a front elevation view of the system of FIG. 4.
Figure 6:
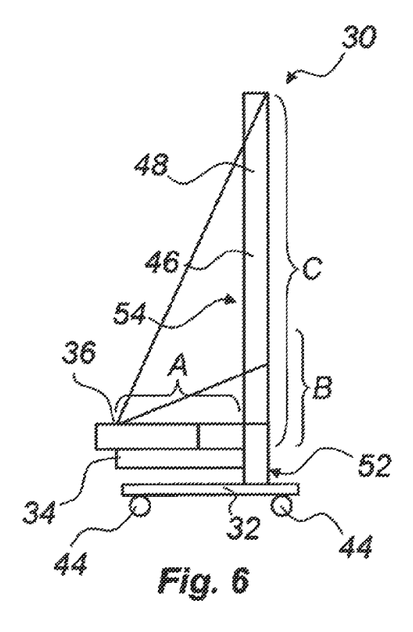
FIG. 6 is a side elevation view of the system of FIG. 4.

As depicted in FIGS. 1-3, a mobile interactive presentation and collaboration system 30, according to an embodiment of the present invention, comprises a cart chassis 32, a projector carriage 34, a rear projector 36 and a screen assembly 38. The cart chassis 32 comprises an elongated front member 40 and at least two side members 42 projecting rearwardly from the ends of the front member 40. As depicted in FIGS. 1, 4, 7, 10 and 13, in certain embodiments, the side members 42 extend in parallel rearward from the front member 40 and angled at about ninety degrees to the front member 40. As depicted in FIG. 21, in certain embodiments, the side members 42 is positioned at about a forty five degree angle relative to the front member 40. In various embodiments, the side members 42 can be angled at a plurality of different angles less than ninety degrees relative to the front member 40 to prevent tipping of the carriage 34 in both an both a fore and aft direction (denoted in FIG. 3 with the arrow annotated "z-z") and in a lateral direction (denoted in FIG. 3 with the arrow annotated "x-x").

In certain embodiments, the cart chassis 32 also comprises a plurality of wheels 44 positioned beneath the front member 40 and the side members 42 allowing the cart chassis 32 to be maneuvered. As depicted in FIGS. 2-3, 5-6, 8-9, 11-12 and 14-15, the wheels 44 can be positioned at the ends of the side members 42 such that the wheels 44 are arranged in a generally rectangular arrangement. In certain embodiments, the wheels 44 can comprise wheel locks for fixing the cart chassis 32 once the cart chassis 32 is positioned in a desired position. In other embodiments, the can chassis 32 can comprise other conventional support elements for supporting the cart chassis 32 including, but not limited to fixed legs, adjustable height legs, toot pads, to friction sliding pads and other conventional mean of supporting and/or moving the cart chassis 32 without tipping the cart chassis 32.

Figures 7, 8:
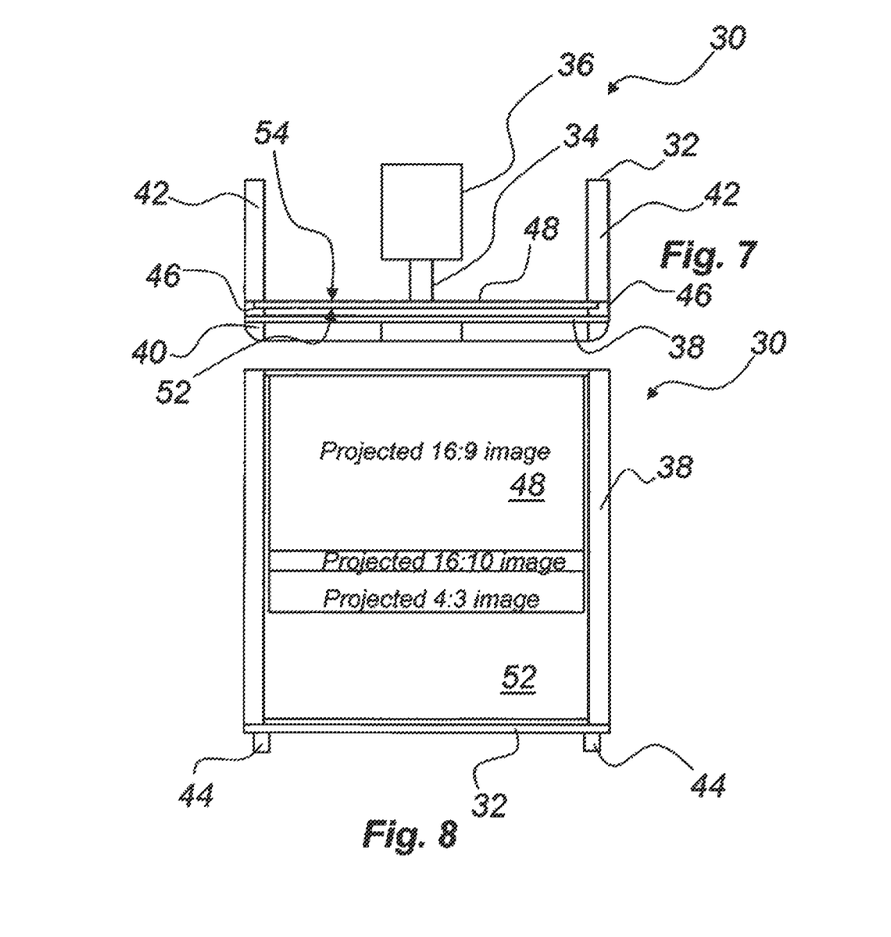
FIG. 7 is a top plan view of a mobile interactive presentation and collaboration system according to an embodiment of the invention in which an NEC Model WT610 projector is used in the system.
FIG. 8 is a front elevation view of the system of FIG. 7.
Figure 9:
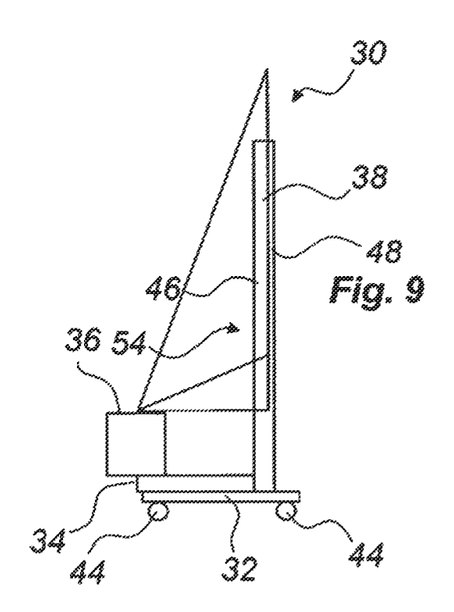
FIG. 9 is a side elevation view of the system of FIG. 7.
Figures 10, 11:
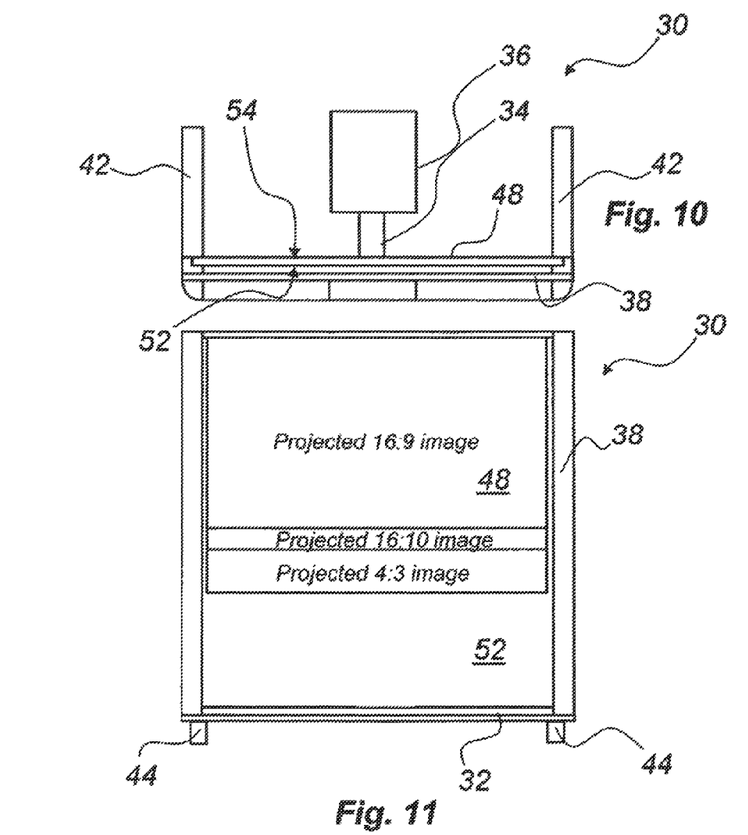
FIG. 10 is a top plan view of a mobile interactive presentation and collaboration system according to an embodiment of the invention in which an NEC Model U310W projector is used in the system.
FIG. 11 is a front elevation view of the system of FIG. 10.
Figure 12:
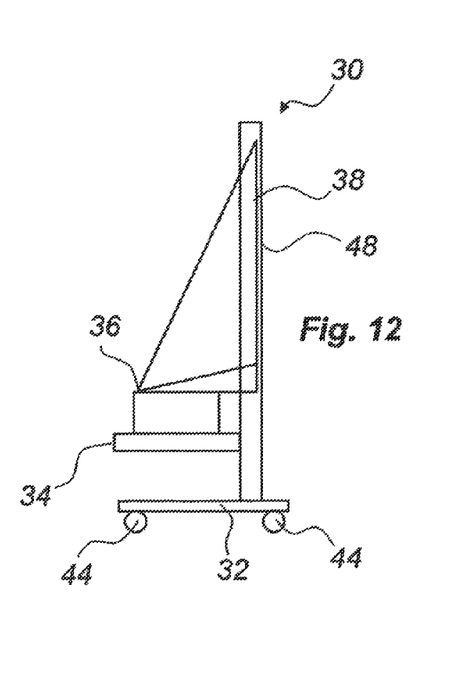
FIG. 12 is a side elevation view of the system of FIG. 10.
Figures 13, 14:
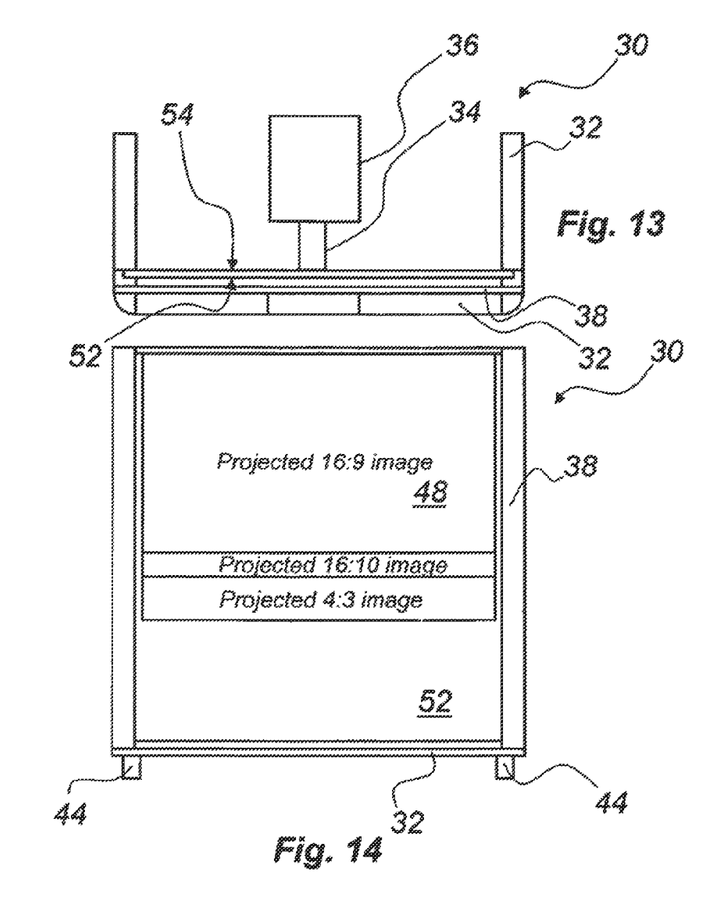
FIG. 13 is a top plan view of a mobile interactive presentation and collaboration system according to an embodiment of the invention in which a Hitachi CP-AW250N projector is used in the system.
FIG. 14 is a front elevation view of the system of FIG. 13.
Figure 15:
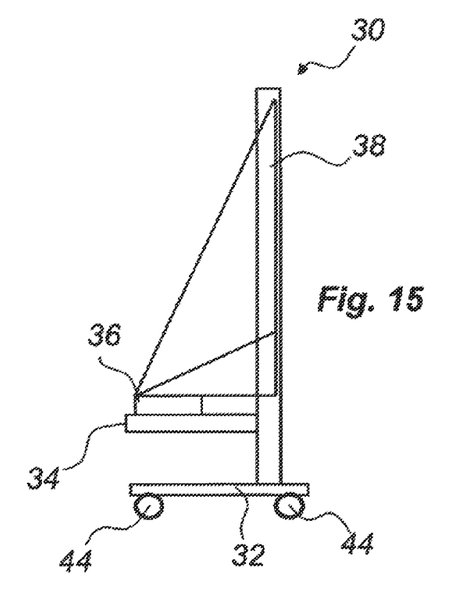
FIG. 15 is a side elevation view of the system of FIG. 13.

As depicted in FIGS. 1, 3-4, 6-7, 9-10, 12-13, 15-16 and 18, the projector carriage 34 defines a generally horizontal shelf for receiving the projector 32. As depicted in FIGS. 7 and 9, in certain embodiments, the projector carriage 34 extends rearward from the front member 40 of the cart chassis 32. In this configuration, the projector carriage 34 is aligned with or proximate to the horizontal plane defined by the side members 42 of the cart chassis 32. As depicted in FIGS. 1, 3-4, 6, 10, 12-13, 15-16 and 18, in certain embodiments, the projector carriage 34 extends rearward from the screen assembly 38. In this configuration, the projector carriage 34 is positioned at or proximate to the bottom most portion of the screen assembly 38 such that the projector carriage 34 is proximate to the cart chassis 34.

Projector 36 may be any suitable short throw projector available on the market. As can be seen, these projectors can enable system 30 to accommodate different aspect ratio projected images, for example 16:9, 16:10 ad 4:3, with appropriate adjustment of the projector position relative to screen assembly 38. In addition to the examples provided, it will be appreciated that any other suitable projection device can be used in system 30 with the appropriate positioning and aspect ratio adjustment.

In certain embodiments, the projector carriage 34 comprises an adjustment assembly allowing the projector carriage 34, and correspondingly the projector 36, to be moved vertically (denoted in FIG. 3 with the arrow annotated "y-y"), in the fore and aft direction and in the lateral direction. The adjustment assembly can comprise but is not limited to a hydraulic system, worm gear assembly, a plurality of engagement points spaced vertically and/or laterally to which the projector carriage 34 can be releasably attached and other conventional means of positioning and fixing the projector carriage 34.

As depicted in FIGS. 1-18, the screen assembly 38 comprises a pair of side supports 46 and rear projection screen 48 having a front face and a rear face. In certain embodiments, the side supports 46 extend vertically from the side members 42 of the cart chassis 32. In this configuration, the side supports 46 are positioned such that side supports 46 are aligned with or proximate to the front member 40 of the cart chassis 32. Alternatively, the side supports 46 extend vertically from the ends of the front member 40 of the cart chassis 32. In certain aspects, the side supports 46 position the rear projection screen 48 such the rear projection screen 48 is positioned a predetermined distance above the cart chassis 32 to define a gap between the bottom of the rear projection screen 48 and the cart chassis 32. In an embodiment as depicted in FIGS. 1-3, and 19-20, rear projection screen 48 can comprise a tempered glass pane 50 presenting a front side 52 and a rear side 54. A suitable white or light colored projection material, for example Dual-Vision white vinyl projection screen material available from Da-Lite Screen Company of Warsaw, Ind. is applied to the rear side 54. It will be appreciated that any other suitable rear projection screen material may be substituted and applied to the rear side 54. It will also be appreciated that another suitable transparent material may be substituted for the tempered glass pane 50, such as polycarbonate or other acrylic material.

Typically, the primary consideration for the projected image is the diagonal screen size. As shown in FIGS. 3, 6, 9, 12 and 15 and the tables below, the projection distance A, the offset distance B and offset distance C can each be varied by adjusting the relative positioning of the projector carriage 34 via the adjustment assembly to provide a projected image having the desired diagonal screen size. For the purposes of this disclosure, the projection distance A is the horizontal distance from the center of the projector lens to the rear face of the rear projection screen 48. The offset distance B is vertical distance from the bottom of the projector to the desired bottom edge of the projected image for the purposes of this disclosure. Similarly, the offset distance C is the vertical distance from the bottom of the projector to the desired top edge of the projected image.

TABLE 1

Representative distances at which the projector carriage 34 can be positioned to provide a desired screen size at a 16:9 aspect ratio

| Screen Size (diagonal) | Projection distance A | Offset Distance B | Offset distance C |
|---|---|---|---|
| 60 inches | 19 to 26 inches | 8.8 to 16.1 inches | 38.2 to 52.1 inches |
| 65 inches | 21 to 28 inches | 9.7 to 17.6 inches | 41.6 to 56.6 inches |
| 70 inches | About 22 inches | About 10.6 inches | About 44.9 inches |
| 80 inches | About 26 inches | About 12.4 inches | About 51.6 inches |
| 90 inches | About 29 inches | About 14.2 inches | About 58.3 inches |
| 93 inches | About 30 inches | About 14.7 inches | About 60.3 inches |

TABLE 2

Representative distances at which the projector carriage 34 can be positioned to provide a desired screen size at a 16:10 aspect ratio

| Screen Size (diagonal) | Projection distance A | Offset Distance B | Offset distance C |
|---|---|---|---|
| 60 inches | 15.6 to 25 inches | 6.9 to 15.6 inches | 38.7 to 54 inches |
| 70 inches | 18.3 to 29 inches | 8.4 to 18.5 inches | 45.5 to 59.4 inches |
| 77 inches | About 20 inches | About 13 inches | About 54 inches |
| 80 inches | 20 to 25 inches | 6.5 to 14.5 inches | 48.5 to 59 inches |
| 85 inches | About 22 inches | About 14 inches | About 60 inches |
| 87 inches | About 22 inches | About 14 inches | About 60 inches |
| 90 inches | 23 to 28 inches | 11.4 to 16 inches | 55.5 to 63.7 inches |
| 96 inches | 24 to 30 inches | 12.3 to 16 inches | 58 to 66 inches |
| 100 inches | 25 to 26.3 inches | 16 to 17.5 inches | 69 to 70.5 inches |

TABLE 3

Representative distances at which the projector carriage 34 can be positioned to provide a desired screen size at a 4:3 aspect ratio

| Screen Size (diagonal) | Projection distance A | Offset Distance B | Offset distance C |
|---|---|---|---|
| 55 inches | 19 to 26 inches | 7.3 to 16.3 inches | 40.3 to 49.3 inches |
| 60 inches | 21 to 29 inches | 8.1 to 17.9 inches | 44.1 to 53.9 inches |
| 63 inches | 18 to 25 inches | 3.7 to 12.3 inches | 41.5 to 50.1 inches |
| 70 inches | 23 to 25 inches | About 9.8 inches | About 51.8 inches |
| 80 inches | 26 to 28 inches | About 11.5 inches | About 59.5 inches |
| 85 inches | About 30 inches | About 12.3 inches | About 63.3 inches |

As depicted in FIGS. 5, 8, 11, and 14, in certain embodiments, the rear projection screen 48 can comprise about five feet, six inches wide by about six feet high, wherein the image projected by the projector 36 is on less than the entire area of rear projection screen 48. In other embodiments, the dimensions of the rear projection screen 48 can be varied according to the needs of the consumer and physical constraints such as the dimensions of doors, elevators and hallways through which the system 30 must be navigated. In certain embodiments, the side members 42 of the chassis cart 32 can be at least fifteen inches in length. In other embodiments, the side members 42 can be at least twenty inches in length. In other embodiments, the side members 42 can be at least twenty five inches in length. Accordingly, in certain embodiments, the side members 42 can be less than forty percent of the length of the side supports 46. In other embodiments, the side members 42 can be less than thirty percent of the length of the side supports 46. In other embodiments, the side members 42 can be less than twenty five percent of the length of the side supports 46. In certain aspects, the projected image can comprise about five fee, four inches wide and about three feet high. In certain embodiments, the projected image can comprise less than seventy percent of the total area of the rear projection screen 48. In other embodiments, the projected image can comprise less than sixty percent of the total area of the rear projection screen 48. In other embodiments, the projected image can comprise less than fifty percent of the total area of the rear projection screen 48. In other embodiments, the projected image can comprise less than forty percent of the total area of the rear projection screen 48

In operation, the projector 36 may be mounted on projector carriage 34 and appropriately adjusted so as to produce an image of a desired aspect ratio projected onto rear side 54 of screen 48. The image is visible from the front side 52 of the screen 48. In certain embodiments, the surface of the pane 50 can be annotated with dry erase or other markers without affecting the screen material on rear side 54. In addition, with the positioning of appropriate sensors on screen assembly 38 and/or cart chassis 32, system 30 may be fully interactive, enabling annotations made on screen 48 to be recorded, and enabling any other such interactive features as are known for use with interactive short throw projection systems.

Figure 16:
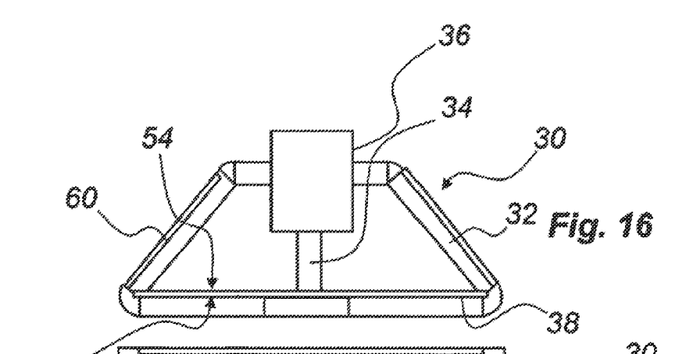
FIG. 16 is a top plan view of a mobile interactive presentation and collaboration system according to an alternative embodiment of the invention.
Figure 17:
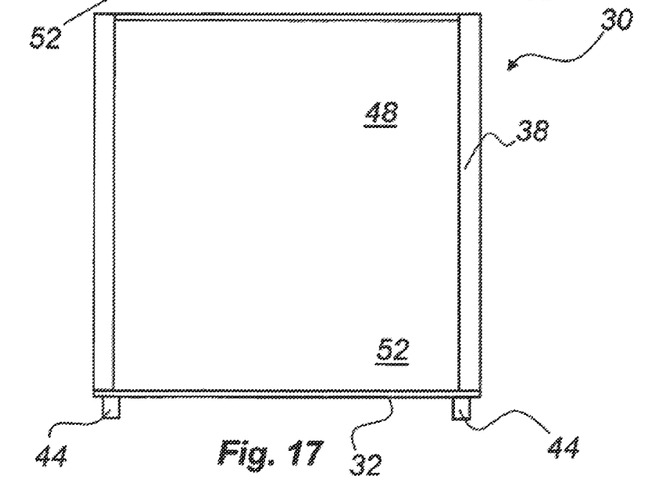
FIG. 17 is a front elevation view of the system of FIG. 16.
Figure 18:
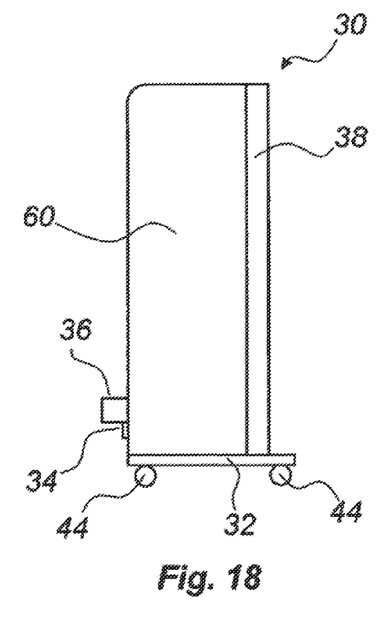
FIG. 18 is a side elevation view of the system of FIG. 16.
Figure 19:
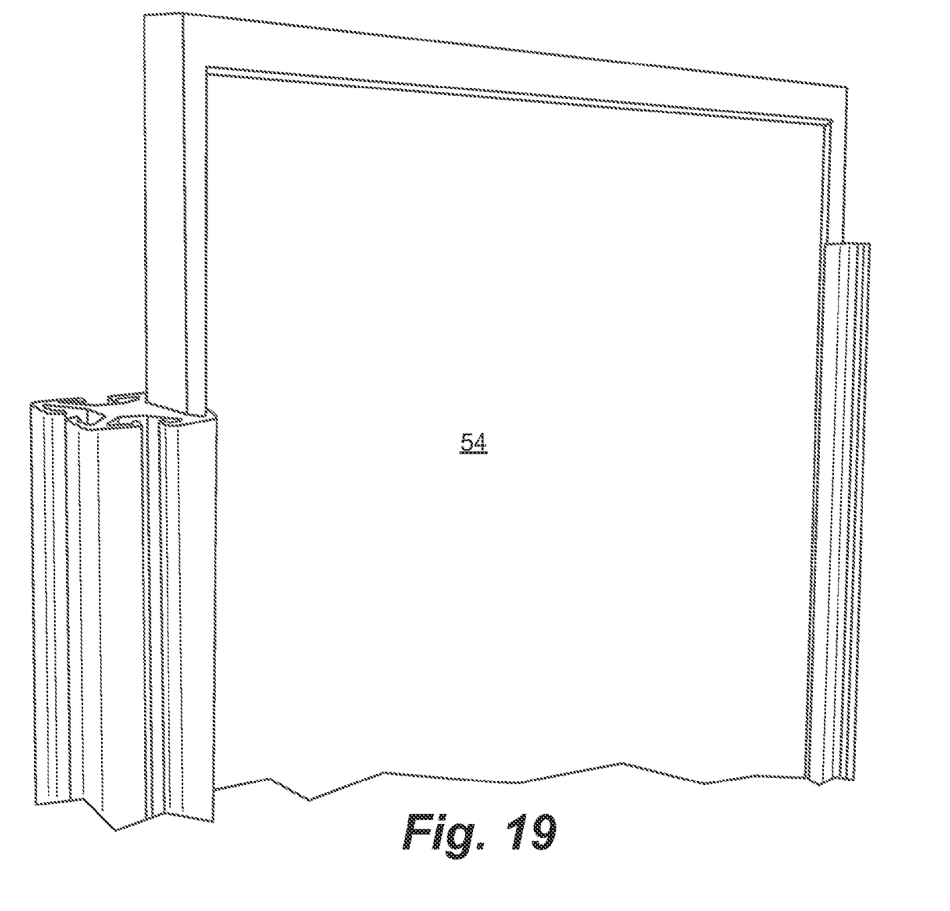
FIG. 19 is a photograph of the rear side of the projection screen of an embodiment according to FIG. 1.
Figure 20:
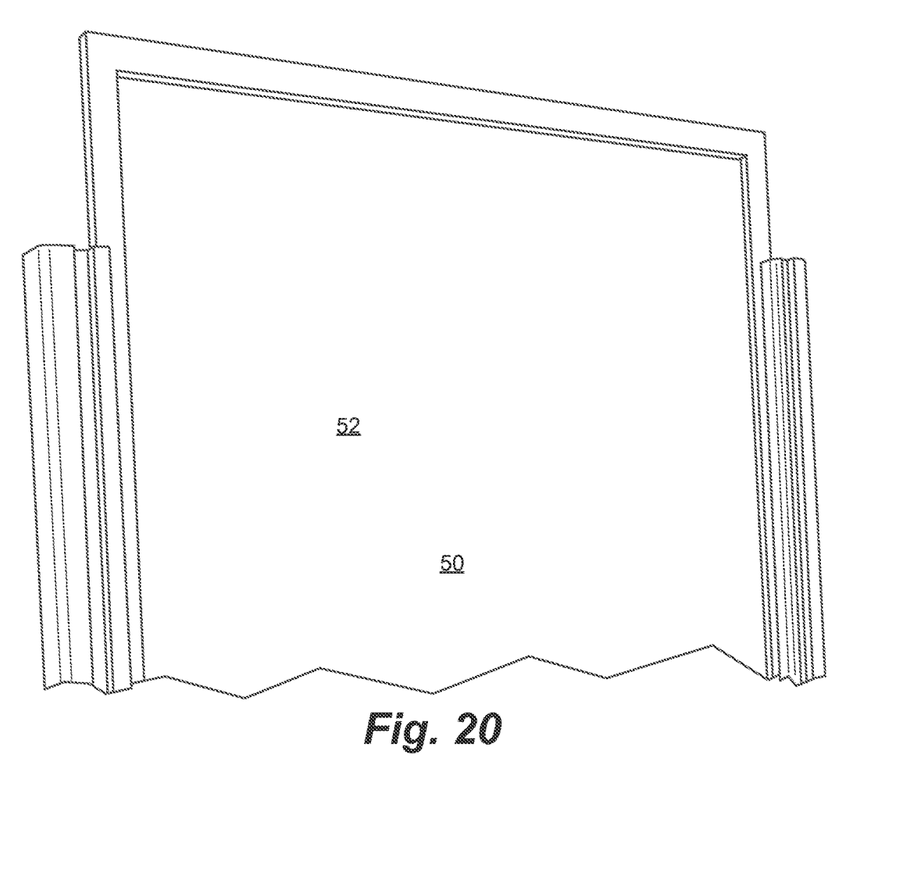
FIG. 20 is a photograph of the front side of the projection screen of an embodiment according to FIG. 1.

As depicted in FIGS. 16-17, in certain embodiments, the system 30 can further comprise at least one rear enclosure panel 60 enclosing and making the projector carriage 34 and the projector 36. Each rear enclosure panel 60 is positioned to project vertically from the side member 42 of the cart chassis 32. In certain embodiments, the cart chassis 32 can further comprise a rear member 62 for linking the ends of the side members 42 opposite the front member 40.

The foregoing descriptions present numerous specific details that provide a thorough understanding of various embodiments of the invention. It will be apparent to one skilled in the art that various embodiments, having been disclosed herein, may be practiced without some or all of these specific details. In other instances, components as are known to those of ordinary skill in the art have not been described in detail herein in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention. Accordingly, this application is intended to cover any adaptations or variations of the invention.

For purposes of interpreting the claims for the present invention, it is expressly intended that the provisions of 35 §112(f) are not to be invoked unless the specific terms "means for" or "step for" are recited in a claim.

The invention claimed is:

1. A mobile interactive presentation and collaboration system, comprising:
   a cart chassis having an elongated front member and at least two side members projecting rearward from the front member to support the front member in a front to back direction;
   a screen assembly having two side supports projecting vertically from the cart chassis and supporting a rear projection screen in a generally vertical orientation, wherein the rear projection screen comprises a front face and a rear face and positioned above the elongate front member and substantially forward of a midpoint of the side members of the cart chassis along the front to back direction; and
   a projector carriage defining a generally horizontal shelf for receiving a short throw projector, such that the short throw projector projects an image directly onto the rear face of the rear projection screen at a steep upwardly directed angle, wherein the projector carriage is positioned rearward from the rear projection screen at about the bottom of the rear projection screen such that the short throw projector counterweights the screen against tipping forward.

2. The mobile interactive presentation and collaboration system of claim 1, wherein the side members of the cart chassis are positioned at about a ninety degree angle to the front member.

3. The mobile interactive presentation and collaboration system of claim 1, wherein the side members of the cart chassis are positioned at an angle to the front member less than ninety degrees.

4. The mobile interactive presentation and collaboration system of claim 1, wherein the side members of the cart chassis are positioned at an angle to the front member between about forty live degrees and ninety degrees.

5. The mobile interactive presentation and collaboration system of claim 1, wherein the rear projection screen comprises a material selected from a group consisting of: a vinyl mesh, a tempered glass, polycarbonate and acrylic polymer.

6. The mobile interactive presentation and collaboration system of claim 1, further comprising an adjustment assembly for moving the projector carriage along in vertical direction parallel to the side supports, a lateral direction parallel to the front member and the front to back direction while maintain a projector received on the projector carriage in a substantially horizontal orientation.

7. The mobile interactive presentation and collaboration system of claim 6, wherein the projector further comprises a projector lens.

8. The mobile interactive presentation and collaboration system of claim 7, wherein the adjustment assembly is adapted to move the projector carriage along the front to back direction to position the projector lens a horizontal distance from the rear face of the rear projection screen of between 15 and 30 inches.

9. The mobile interactive presentation and collaboration system of claim 1, wherein the rear projection screen defines a predetermined area.

10. The mobile interactive presentation and collaboration system of claim 9, wherein the image projected by the projector covers a maximum of less than seventy percent of the predetermined area of the rear projection screen.

11. The mobile interactive presentation and collaboration system of claim 9, wherein the image projected by the projector covers a maximum of less than sixty percent of the predetermined area of the rear projection screen.

12. The mobile interactive presentation and collaboration system of claim 9, wherein the image projected by the projector covers a maximum of less than fifty percent of the predetermined area of the rear projection screen.

13. The mobile interactive presentation and collaboration system of claim 9, wherein the image projected by the projector covers a maximum of less than forty percent of the predetermined area of the rear projection screen.

14. The mobile interactive presentation and collaboration system of claim 1, further comprising at least one rear enclosure panel extending vertically from the side members of the cart chassis.

15. The mobile interactive presentation and collaboration system of claim 1, wherein the side members of the chassis are less than forty percent of the length of the side supports of the screen assembly.

16. The mobile interactive presentation and collaboration system of claim 1, wherein the side members of the chassis are less than thirty percent of the length of the side supports of the screen assembly.

17. The mobile interactive presentation and collaboration system of claim 1, wherein the side members of the chassis are less than twenty five percent of the length of the side supports of the screen assembly.

\* \* \* \* \*